(12) United States Patent
Hopkins et al.

(10) Patent No.: US 10,675,803 B2
(45) Date of Patent: Jun. 9, 2020

(54) SEAM CONCEALMENT FOR THREE-DIMENSIONAL MODELS

(71) Applicant: Stratasys, Inc., Eden Prairie, MN (US)

(72) Inventors: Paul E. Hopkins, Savage, MN (US); Donald J. Holzwarth, Minnetonka, MN (US)

(73) Assignee: STRATASYS, INC., Eden Prairie, MN (US)

( * ) Notice: Subject to any disclaimer, the term of this patent is extended or adjusted under 35 U.S.C. 154(b) by 0 days.

(21) Appl. No.: 16/299,724

(22) Filed: Mar. 12, 2019

(65) Prior Publication Data

US 2019/0202104 A1 Jul. 4, 2019

Related U.S. Application Data

(60) Continuation of application No. 15/660,289, filed on Jul. 26, 2017, now abandoned, which is a
(Continued)

(51) Int. Cl.
*B29C 64/106* (2017.01)
*B29C 64/386* (2017.01)
(Continued)

(52) U.S. Cl.
CPC .............. *B29C 48/21* (2019.02); *B29C 48/92* (2019.02); *B29C 64/106* (2017.08);
(Continued)

(58) Field of Classification Search
CPC .............. B29C 47/065; B29C 67/0055; B29C 67/0088; B29C 47/92; B29C 2947/92076; B29C 2947/92409; B29C 2947/92428; B29C 2947/92571; B29C 47/0023; B29C 48/21; B29C 48/92; B29C 64/112; B29C 64/171; B29C 64/124; B29C 64/106; B29C 64/386; B29C 48/09; B29C 2948/92076;
(Continued)

(56) References Cited

U.S. PATENT DOCUMENTS 3,291,857 A 12/1966 Howerton
4,352,007 A 9/1982 Baker et al.
(Continued)

FOREIGN PATENT DOCUMENTS

EP 0180383 A2 5/1986
GB 2156440 A 10/1985
(Continued)

OTHER PUBLICATIONS

Bowyer, Adrian. "Build Quality", Weblog entry. RepRap Blog. Jul. 26, 2009. (Year: 2009).*
(Continued)

*Primary Examiner* — Leith S Shafi
(74) *Attorney, Agent, or Firm* — West, Champlin & Koehler, P.A.

(57) ABSTRACT

A three-dimensional model built with an extrusion-based digital manufacturing system, and having a perimeter based on a contour tool path that defines an interior region of a layer of the three-dimensional model, where at least one of a start point and a stop point of the contour tool path is located within the interior region of the layer.

17 Claims, 9 Drawing Sheets

Related U.S. Application Data continuation of application No. 13/707,884, filed on Dec. 7, 2012, now Pat. No. 9,724,866, which is a division of application No. 12/565,397, filed on Sep. 23, 2009, now Pat. No. 8,349,239.

(51) Int. Cl.
| | |
|---|---|
| *B29C 48/21* | (2019.01) |
| *B33Y 50/02* | (2015.01) |
| *B29C 48/92* | (2019.01) |
| *G05B 19/4099* | (2006.01) |
| *B29C 64/124* | (2017.01) |
| *B29C 64/112* | (2017.01) |
| *B29C 64/171* | (2017.01) |
| *B29C 48/09* | (2019.01) |
| *B29K 25/00* | (2006.01) |
| *B29K 55/02* | (2006.01) |
| *B29K 69/00* | (2006.01) |
| *B29K 77/00* | (2006.01) |
| *B29K 79/00* | (2006.01) |
| *B29K 81/00* | (2006.01) |

(52) U.S. Cl.
CPC .......... *B29C 64/112* (2017.08); *B29C 64/124* (2017.08); *B29C 64/171* (2017.08); *B29C 64/386* (2017.08); *B33Y 50/02* (2014.12); *G05B 19/4099* (2013.01); *B29C 48/09* (2019.02); *B29C 2948/92076* (2019.02); *B29C 2948/92409* (2019.02); *B29C 2948/92428* (2019.02); *B29C 2948/92571* (2019.02); *B29K 2025/00* (2013.01); *B29K 2055/02* (2013.01); *B29K 2069/00* (2013.01); *B29K 2077/00* (2013.01); *B29K 2079/085* (2013.01); *B29K 2081/06* (2013.01); *Y10T 428/24777* (2015.01); *Y10T 428/24802* (2015.01)

(58) Field of Classification Search
CPC .......... B29C 2948/92409; B29C 2948/92428; B29C 2948/92571; B33Y 50/02; B33Y 50/00; B33Y 10/00; G05B 19/4099; Y10T 428/24777; Y10T 428/24802; B29K 2069/00; B29K 2081/06; B29K 2077/00; B29K 2079/085; B29K 2025/00; B29K 2055/02
USPC ............. 428/195.1; 264/239, 241, 299, 308; 425/500, 516, 110, 113, 130; 700/56, 700/61–64, 184, 190, 118–120
See application file for complete search history.

(56) References Cited

U.S. PATENT DOCUMENTS

| | | |
|---|---|---|
| 4,749,347 A | 6/1988 | Valavaara |
| 5,042,228 A | 8/1991 | Pearson |
| 5,121,329 A | 6/1992 | Crump |
| 5,141,680 A | 8/1992 | Almquist et al. |
| 5,340,433 A | 8/1994 | Crump |
| 5,490,962 A | 2/1996 | Cima et al. |
| 5,491,643 A | 2/1996 | Batchelder |
| 5,501,824 A | 3/1996 | Almquist et al. |
| 5,503,785 A | 4/1996 | Crump et al. |
| 5,518,680 A | 5/1996 | Cima et al. |
| 5,587,913 A | 12/1996 | Abrams et al. |
| 5,653,925 A | 8/1997 | Batchelder |
| 5,701,403 A | 12/1997 | Watanabe et al. |
| 5,738,817 A | 4/1998 | Danforth et al. |
| 5,764,521 A | 6/1998 | Batchelder et al. |
| 5,939,008 A | 8/1999 | Comb et al. |
| 5,968,561 A | 10/1999 | Batchelder et al. |
| 6,028,410 A | 2/2000 | Leavitt et al. |
| 6,054,077 A | 4/2000 | Comb et al. |
| 6,070,107 A | 5/2000 | Lombardi et al. |
| 6,228,923 B1 | 5/2001 | Lombardi et al. |
| 6,323,859 B1 | 11/2001 | Gantt |
| 6,547,995 B1 | 4/2003 | Comb |
| 6,572,807 B1 | 6/2003 | Fong |
| 6,645,412 B2 | 11/2003 | Priedeman, Jr. |
| 6,722,872 B1 | 4/2004 | Swanson et al. |
| 6,790,403 B1 | 9/2004 | Priedeman, Jr. et al. |
| 6,813,594 B2 | 11/2004 | Guertin et al. |
| 6,823,230 B1 | 11/2004 | Jamalabad et al. |
| 6,859,681 B1 | 2/2005 | Alexander |
| 6,923,634 B2 | 8/2005 | Swanson et al. |
| 7,122,246 B2 | 10/2006 | Comb et al. |
| 7,899,569 B2 | 3/2011 | Holzwarth |
| 8,349,239 B2 | 1/2013 | Hopkins et al. |
| 2003/0032214 A1 | 2/2003 | Huang |
| 2003/0056870 A1 | 3/2003 | Comb et al. |
| 2003/0236588 A1 | 12/2003 | Jang et al. |
| 2004/0075196 A1 | 4/2004 | Leyden et al. |
| 2007/0003656 A1 | 1/2007 | LaBossiere et al. |
| 2007/0179657 A1 | 8/2007 | Holzwarth |
| 2007/0228590 A1 | 10/2007 | LaBossiere et al. |
| 2008/0213419 A1 | 9/2008 | Skubic et al. |
| 2009/0018685 A1 | 1/2009 | Holzwarth |
| 2009/0035405 A1 | 2/2009 | Leavitt |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |

FOREIGN PATENT DOCUMENTS

| | | |
|---|---|---|
| WO | 96/11356 A1 | 4/1996 |
| WO | 97/50278 A1 | 12/1997 |

OTHER PUBLICATIONS

Bowyer, Adrian. Reprap Project filed RrPolygonList.java; Jul. 27, 2009. <http://sourceforge.net/p/reprap/code/3270/tree/trunk/reprap/host/src/org/reprap/geometry/polygons/RrPolygonList.java> (Year: 2009).*

Clancy, R., et al. "Fused deposition of ceramics: progress towards a robust and controlled process for commercialization." 1997 International Solid Freeform Fabrication Symposium. 1997. (Year: 1997).

Bowyer, A.: "Build Quality", Weblog entry. RepRap Blog, Jul. 26, 2009, www.reprap.org.

"*Microboards Technology, LLC d/b/a Afinia v. Stratasys, Inc.*", Petition for Inter Partes Review of U.S. Pat. No. 8,349,239 entitled "Seam Concealment for Three-Dimensional Models", filed Nov. 21, 2014, pp. 1-65.

"FDM System Documentation", Stratasys, Inc. (Updated Jan. 22, 1999) (AFINIA000001-225).

Ruan et al.: "2-D Deposition Pattern and Strategy Study on Rapid Manufacturing", Proceedings of IDETC/CIE 2006, Paper No. DETC2006-99326, ASME 2006 International Design Engineering Technical Conferences & Computers and Information in Engineering Conference, Philadelphia, Pennsylvania, USA, Sep. 10-13, 2006, pp. 967-973 (AFINIA00001900-1906) (IPR Exhibit No. 1007).

"Utilities Manual Release 5.0", Stratasys, Inc. No. FUM5.0, pp. U-2 through U-26, Oct. 1, 1997 (AFINIA00001907-1932).

David Manley: "A Man & His Glue Gun", Manufacturing.net, Jun. 14, 2012, available at: http://www.manufacturing.net/blogs/2012/06/a-man-%26-his-glue-gun.

Sabourin et al.: "Adaptive High-Precision Exterior, High-Speed INterior, Layered Manufacturing," Virginia Polytechnic Institute and State University, Blacksburg, VA., Feb. 1996 (AFINIA00001951-2040).

Zhihuang, "Study and Development of Large Patternless Casting Molding," Chapter 2, pp. 12-26, Tsinghua University, May 2000 (AFINIA00002084-2099).

Kulkarni et al., "Deposition Strategies and Resulting Part Stiffnesses in Fused Deposition Modeling," Journal of Manufacturing Science and Engineering, Feb. 1999, vol. 121, pp. 93-103 (AFINIA00002100-2110) (IPR Exhibit No. 1006).

(56) References Cited

OTHER PUBLICATIONS

"FDM 2000 Introduction Manual", Oct. 1, 1997, pp. F2000-2-F2000-33 (AFINIA00002100-2165).
"FDM 2000 Reference", FDM 2000 Manual, Oct. 1, 1997, pp. F2000-47-F2000-54 (AFINIA00002166-2174).
Whelan et al., Injection Molding of Thermoplastics Materials, "Injection Molding of Engineering Thermoplastics Materials" and "Injection Molding of Engineering Thermoplastics," vol. 1 (1990) (excerpts) (AFINIA00002180-2188; AFINIA 00002189-2197 (duplicate)).
"BASF Says its MIPS Offers More Gloss," Plastic News, Jan. 15, 1996, pp. 1-3, www.plasticnews.com (AFINIA00002198-2200).
"Stratasys Purchases IBM Rapid Prototyping Technology," PR Newswire, Jan. 3, 1995, http://www.thefreelibrary.com (AFINIA00002201-2202).
J. Kao, "Process Planning for Additive/Subtractive Sold Freeform Fabrication Using Medial Axis Trasform," A Stanford University Dissertation, Jun. 1999 (AFINIA00002203-2353) (IPR Exhibit No. 1005).
Rapid Prototyping heats up with new desktop systems, fast ABS models,"Machine Design," 68.6 (Mar. 21, 1996); www.go.galegroup.com (AFINIA00002354-2355).
S. Ashley, "Rapid Prototyping is Coming of Age," Mechanical Engineering, vol. 117, No. 7, Jul. 1995, pp. 62-68; www-rp.me.vt.educ/bohn/rp/ME-7-95/art000/ (AFINIA00002356-2363).
Pang, et al., "Stereolithography 1993: Quickcast", Proceedings of the Solid Freeform Fabrication Symposium, vol. 4, 1993, The University of Texas at Austin, Austin, TX, pp. 158-67 (AFINIA00002364-2373).
Stratasys, Inc. 10KSB40 (Annual and Transition Reports), for the Period Ending Dec. 31, 1996, filed Mar. 27. 1997 (AFINIA00002374-2420).
Stratasys, Inc. SEC Form 10-KSB, Annual Report for the Fiscal Year Ending Dec. 31, 1998, Stratasys, Inc. (AFINIA00002421-2478).
Stratasys, Inc.'s License/Terms and Conditions of Sale (AFINIA00002479-2486).
Stratasys, Inc., Form 10KSB Annual Report for the Period Ending Dec. 31, 1997, filed Mar. 31, 1998 (AFINIA00002487-2554).
Agarwala, et al., "Structural Quality of Parts Processed by Fused Deposition," Rapid Prototyping Journal, vol. 2.4, 1996, pp. 4-19 (AFINIA00002555-2570).
Jamalabad, et al., "Topology Driven Improvement of FDC Build Parameters,"Solid Freeform Fabrication of Advanced Ceramics Phase II project, pp. 319-326 (AFINIA00002571-2729).
"Using a Stratasys 1650 Fused Deposition Modeling (FDM) Machine and INsight," www.jcflowers1.iweb.bsu.educ/rlo/fdm.thm (AFINIA00002724-2729).
Van Weeren et al., "Quality of Parts Processed by Fused Deposition," Proceedings of Solid Free Form Fabrication Symposium, The University of Texas, Austin, TX, pp. 314-321, Aug. 1995 (AFINIA00005338-5345).
Qiu, et al., "Virtual Simulation for Multi-material LM Process," Proceedings of Solid Freeform Fabrication Symposium, The University of Texas, Austin, TX, pp. 681-688, Aug. 1998 (AFINIA00005346-5353).
Lewis et al., "Direct Ink Writing of Three-Dimensional Ceramic Structures," Journal of American Ceramic Society, vol. 89, No. 12, pp. 3599-3609 (2006) (AFINIA00005354-5369).
Mudge, et al., "Laser Engineered Net Shaping Advances Additive Manufacturing and Repair," Welding Journal, pp. 44-48, Jan. 2007 (AFINIA00005365-5369).
Wah, et al., "Tool Path Optimization in Layered Manufacturing," IIE Transactions, Apr. 1, 2002, vol. 34, Issue 4, pp. 335-347 (AFINIA00005383-5405).
Qiu, et al., "Intelligent Toolpath for Extrusion-based LM Process," Proceedings of Solid Freeform Fabrication Symposium, University of Texas, Austin, Texas, pp. 519-528 (1999) (AFINIA00005737-5746).
"Microboards Technology, LLC d/b/a AFINIA's Prior Art Statement and Preliminary Invalidity Contentions", U.S. District court, District of Minnesota, filed Oct. 2, 2014, 39 pages.
File History of U.S. Pat. No. 8,349,239, 152 pages (IPR Exhibit No. 1002).
Declaration of Thomas A. Campbell, Ph. D. In Support of Petition for Inter Partes Review of U.S. Pat. No. 8,349,239, 92 pages (IPR Exhibit No. 1003).
Curriculum Viate of Thomas A. Campbell, Ph. D., 24 pages (IPR Exhibit No. 1004).
Complaint, *Stratasys Inc. V. Microboards Technology, LLC, d/b/a AFINIA,* Case No. 13-cv-03228 (DWF-JJG) (D. Minn. Nov. 25, 2013) [Dkt No. 1], 131 pages (IPR Exhibit No. 1010).
Summons and Affidavit of Service on Microboards Technology, LLC d/b/a AFINIA, Nov. 25, 2013 [Dkt. No. 5], 2 pages (IPR Exhibit No. 1011).
Bowyer, Adrian; Reprap Project file RrPolygonLIst.java; Jul. 27, 2009; http://sourceforge.net/p/reprap/code/3270/tree/trunk/reprap/host/src/org/reprap/geometry/polygons/RrPolygonList.java.

\* cited by examiner

SEAM CONCEALMENT FOR THREE-DIMENSIONAL MODELS

CROSS-REFERENCE TO RELATED APPLICATION(S)

This is a continuation application of U.S. patent Ser. No. 15/660,289, filed Jul. 26, 2017, which is a continuation application of U.S. patent Ser. No. 13/707,884, filed Dec. 7, 2012, which is a divisional application of U.S. patent application Ser. No. 12/565,397, filed on Sep. 23, 2009, published as U.S. Pat. No. 8,349,239, and entitled "SEAM CONCEALMENT FOR THREE-DIMENSIONAL MODELS", the contents of which are incorporated by reference in its entirety.

BACKGROUND

The present disclosure relates to direct digital manufacturing systems for building three-dimensional (3D) models. In particular, the present invention relates to techniques for building 3D models with extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable consumable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates one or more tool paths for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Consumable support material is then deposited from a second nozzle pursuant to the generated geometry during the build process. The support material adheres to the modeling material during fabrication, and is removable from the completed 3D model when the build process is complete.

SUMMARY

A first aspect of the present disclosure is directed to a method for building a 3D model with an extrusion-based digital manufacturing system. The method includes generating a contour tool path that defines an interior region of a layer of the 3D model, where the contour tool path comprises a start point and a stop point, and where at least one of the start point and the stop point is located within the interior region of the layer.

Another aspect of the present disclosure is directed to a method for building a 3D model with an extrusion-based digital manufacturing system, where the method includes receiving data comprising tool paths for building a plurality of layers of the 3D model. The method also includes extruding a material in a pattern based on the tool paths to form a perimeter of the extruded material for one of the layers of the 3D model, where the perimeter has a start point and a stop point, and defines an interior region of the layer, and where at least one of the start point and the stop point is located within the interior region of the layer.

Another aspect of the present disclosure is directed to a 3D model built with an extrusion-based digital manufacturing system. The 3D model includes a plurality of layers of an extruded material, where at least one of the layers includes a perimeter of the extruded material, and where the perimeter has a start point and a stop point. The layer also includes an interior region defined by the perimeter, where at least one of the start point and the stop point is located within the interior region of the layer.

DETAILED DESCRIPTION

The present disclosure is directed to a method for building 3D models with deposition patterns that contain concealed seams. As discussed below, the method involves adjusting the start point and/or the stop point of a contour tool path of a 3D model layer to one or more locations that are within an interior region of the layer. This effectively conceals the seam that is formed at the intersection of the starting and stop points, which can increase the aesthetic and functional qualities of the resulting 3D model.

The following discussion of 3D models with concealed seams is made with reference to 3D models built with modeling materials since consumers are generally more concerned about the aesthetic and physical qualities of the intended 3D models, and are less concerned about such qualities of the "support materials" used to form support structures, which are typically removed and discarded. However, the techniques for forming concealed seams may also be used to form support structures having concealed seams. Thus, the term "three-dimensional model" may apply to a 3D model built with a modeling material and to a support structure built with a support material.

Figure 1:
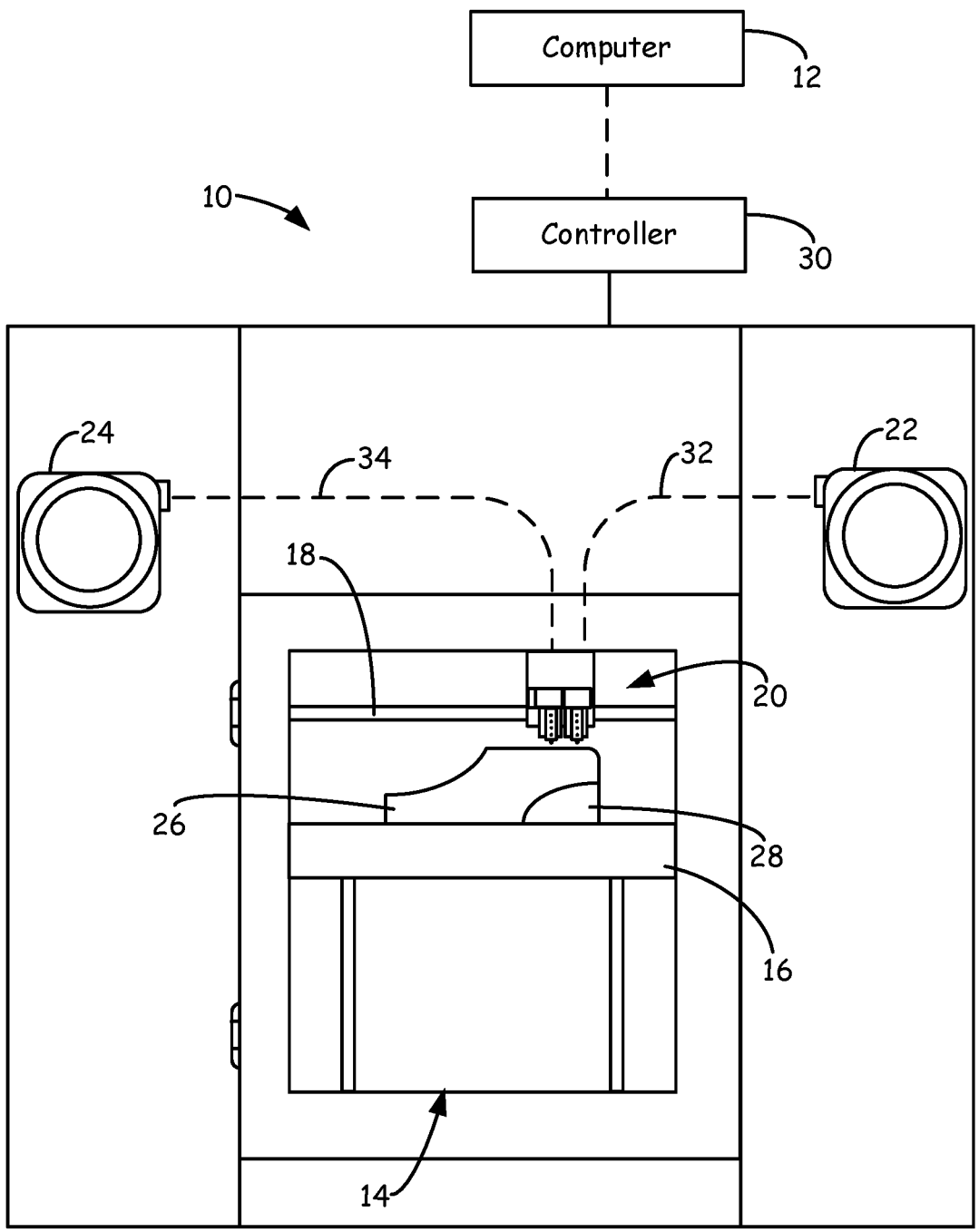
FIG. 1 is a front view of an extrusion-based digital manufacturing system for building 3D models and support structures.

FIG. 1 is a front view of system 10 in use with computer 12, where system 10 is an extrusion-based digital manufacturing system that may be used to build 3D models and/or support structures with concealed seams. As shown, system 10 includes build chamber 14, platen 16, gantry 18, extrusion head 20, and supply sources 22 and 24. Suitable extrusion-based digital manufacturing systems for system 10 include fused deposition modeling systems developed by Stratasys, Inc., Eden Prairie, Minn.

Build chamber 14 is an enclosed, heatable environment that contains platen 16, gantry 18, and extrusion head 20 for building a 3D model (referred to as 3D model 26) and a corresponding support structure (referred to as support structure 28). Platen 16 is a platform on which 3D model 26 and support structure 28 are built, and moves along a vertical z-axis based on signals provided from controller 30. As discussed below, controller 30 directs the motion of platen 16 and extrusion head 20 based on data supplied by computer 12.

Gantry 18 is a guide rail system configured to move extrusion head 20 in a horizontal x-y plane within build chamber 14 based on signals provided from controller 30. The horizontal x-y plane is a plane defined by an x-axis and a y-axis (not shown in FIG. 1), where the x-axis, the y-axis, and the z-axis are orthogonal to each other. In an alternative embodiment, platen 16 may be configured to move in the horizontal x-y plane within build chamber 14, and extrusion head 20 may be configured to move along the z-axis. Other similar arrangements may also be used such that one or both of platen 16 and extrusion head 20 are moveable relative to each other.

Extrusion head 20 is supported by gantry 18 for building 3D model 26 and support structure 28 on platen 16 in a layer-by-layer manner, based on signals provided from controller 30. Accordingly, controller 30 also directs extrusion head 20 to selectively deposit the modeling and support materials based on data supplied by computer 12. In the embodiment shown in FIG. 1, extrusion head 20 is a dual-tip extrusion head configured to deposit modeling and support materials from supply source 22 and supply source 24, respectively.

Examples of suitable extrusion heads for extrusion head 20 include those disclosed in LaBossiere, et al., U.S. Patent Application Publication Nos. 2007/0003656 and 2007/00228590; and Leavitt, U.S. Patent Application Publication No. 2009/0035405. Alternatively, system 10 may include one or more two-stage pump assemblies, such as those disclosed in Batchelder et al., U.S. Pat. No. 5,764,521; and Skubic et al., U.S. Patent Application Publication No. 2008/0213419. Furthermore, system 10 may include a plurality of extrusion heads 18 for depositing modeling and/or support materials.

The modeling material may be provided to extrusion head 20 from supply source 22 through pathway 32. Similarly, the support material may be provided to extrusion head 20 from supply source 24 through pathway 34. System 10 may also include additional drive mechanisms (not shown) configured to assist in feeding the modeling and support materials from supply sources 22 and 24 to extrusion head 20.

The modeling and support materials may be provided to system 10 in a variety of different media. For example, the modeling and support materials may be provided as continuous filaments fed respectively from supply sources 22 and 24, as disclosed in Swanson et al., U.S. Pat. No. 6,923,634; Comb et al., U.S. Pat. No. 7,122,246; and Taatjes et al, U.S. Patent Application Publication Nos. 2010/0096489 and 2010/0096485. Examples of suitable average diameters for the filaments of the modeling and support materials range from about 1.27 millimeters (about 0.050 inches) to about 2.54 millimeters (about 0.100 inches), with particularly suitable average diameters ranging from about 1.65 millimeters (about 0.065 inches) to about 1.91 millimeters (about 0.075 inches). Alternatively, the modeling and support materials may be provided as other forms of media (e.g., pellets and resins) from other types of storage and delivery components (e.g., supply hoppers and vessels).

Suitable modeling materials for building 3D model 26 include materials having amorphous properties, such as thermoplastic materials, amorphous metallic materials, and combinations thereof. Examples of suitable thermoplastic materials for ribbon filament 34 include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in U.S. patent application Ser. No. 12/417,740.

Suitable support materials for building support structure 28 include materials having amorphous properties (e.g., thermoplastic materials) and that are desirably removable from the corresponding modeling materials after 3D model 24 and support structure 26 are built. Examples of suitable support materials for ribbon filament 34 include water-soluble support materials commercially available under the trade designations "WATERWORKS" and "SOLUBLE SUPPORTS" from Stratasys, Inc., Eden Prairie, Minn.; break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Patent Application Publication No. 2010/0096072.

Prior to a build operation, computer 12 may receive a digital representation of 3D model 26. Computer 12 is one or more computer-based systems that communicates with system 10 (e.g., with controller 30), and may be separate from system 10, or alternatively may be an internal component of system 10. Upon receipt of the digital representation of 3D model 26, computer 12 may reorient the digital representation and generate one or more supports for any overhanging regions that require vertical support (e.g., with support structure 28).

Computer 12 may then slice the digital representation and generated supports into multiple layers. For each layer, computer 12 may then generate one or more tool paths for extrusion head 20 to follow for building each layer of 3D model 26 and support structure 28. The generation of the tool path(s) for a layer of 3D model 26 may initially involve generating one or more contour tool paths that define the perimeter(s) of 3D model 26 for the given layer. As discussed below, computer 12 also desirably adjusts the start point and/or the stop point of each contour tool path of the layer to one or more locations that are within an interior region of the layer defined by the respective contour tool path. This effectively conceals the seam that is formed at the intersection of the start and stop points.

Based on each generated contour tool path, computer 12 may then generate one or more additional tool paths (e.g., raster paths) to fill in the interior region(s) defined by the perimeter(s), as necessary. As further discussed below, the generation of the additional tool path(s) (e.g., raster paths) desirably compensate for the adjustments in the locations of the start points and/or the stop points of the contour tool path(s).

One or more tool paths for the layer of support structure 28 may also be generated in the same manner. This process may then repeated be for each sliced layer of the digital representation, and the generated data may be stored on any suitable computer storage medium (e.g., on a storage device of computer 12). The generated data may also be transmitted from computer 12 to controller 30 for building 3D model 26 and support structure 28.

During a build operation, controller 30 directs one or more drive mechanisms (not shown) to intermittently feed the modeling and support materials to extrusion head 20 from supply sources 22 and 24. For each layer, controller 30 then directs gantry 18 to move extrusion head 20 around in the horizontal x-y plane within build chamber 14 based on the generated tool paths. The received modeling and support materials are then deposited onto platen 16 to build the layer of 3D model 26 and support structure 28 using the layer-based additive technique.

The formation of each layer of 3D model 26 and support structure 28 may be performed in an intermittent manner in which the modeling material may initially be deposited to form the layer of 3D model 26. Extrusion head 20 may then be toggled to deposit the support material to form the layer of support structure 28. The reciprocating order of modeling and support materials may alternatively be used. The deposition process may then be performed for each successive layer to build 3D model 26 and support structure 28. Support structure 28 is desirably deposited to provide vertical support along the z-axis for overhanging regions of the layers of 3D model 26. After the build operation is complete, the resulting 3D model 26/support structure 28 may be removed from build chamber 14, and support structure 28 may be removed from 3D model 26.

Figure 2:
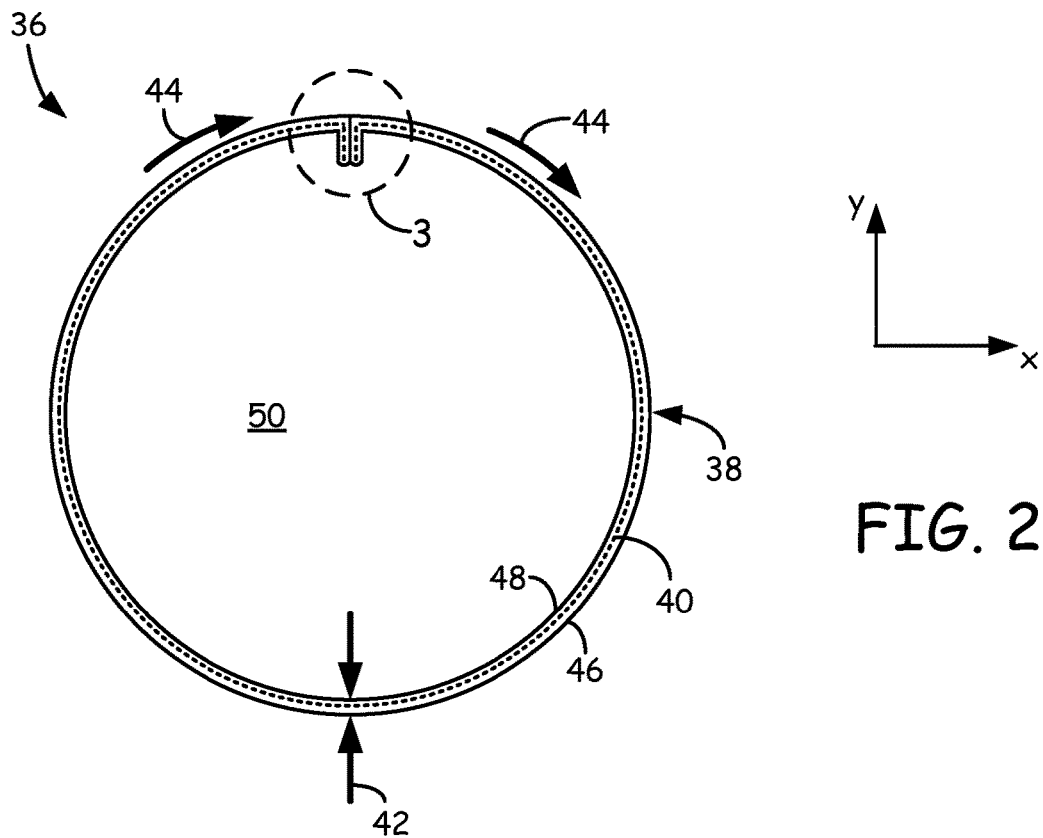
FIG. 2 is a top view of a layer of a 3D model being built with the extrusion-based digital manufacturing system.
Figure 3:
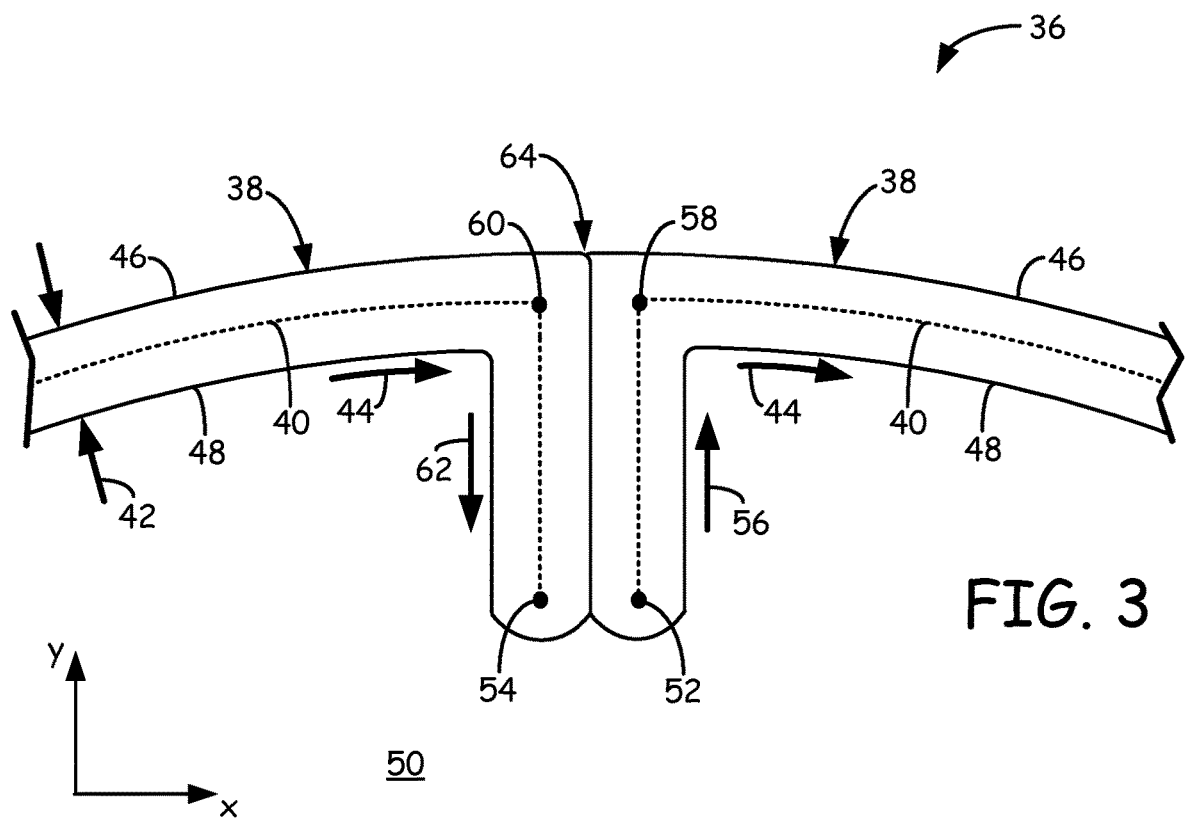
FIG. 3 is an expanded view of section 3 taken in FIG. 2, illustrating a seam of the layer with an open-square arrangement.

FIGS. 2 and 3 illustrate layer 36, which is a layer of 3D model 26 formed by depositing a modeling material with system 10. As shown in FIG. 2, layer 36 includes perimeter path 38, which is a road of a modeling material that is deposited by extrusion head 20 along contour tool path 40. As discussed above, contour tool path 40 may be generated by computer 12 based on road width 42, which is a predicted width of a deposited road of the modeling material, and may depend on a variety of factors, such as modeling material properties, the type of extrusion-based digital manufacturing system used, extrusion conditions, extrusion tip dimensions, and the like. Suitable widths for road width 42 range from about 250 micrometers (about 10 mils) to about 1,020 micrometers (about 40 mils), with particularly suitable widths ranging from about 380 micrometers (about 15 mils) to about 760 micrometers (about 30 mils).

In the current example, the modeling material is deposited along contour tool path 40 in a clockwise direction, as represented by arrows 44, to form perimeter path 38. Alternatively, the modeling material may be along contour tool path 40 in a counter-clockwise direction. Perimeter path 38 includes exterior surface 46 and interior surface 48, which are each offset from contour tool path 40 by about one-half of road width 42. Exterior surface 46 is the outward-facing surface of perimeter path 38 and may be observable when 3D model 26 is completed. Interior surface 48 is the inward-facing surface of perimeter path 38, which defines interior region 50. Interior region 50 is the region of layer 36 confined within perimeter path 38, and may be filled with additional modeling material deposited along additionally generated tool paths (e.g., raster paths, not shown).

As shown in FIG. 3, contour tool path 40 includes start point 52 and stop point 54, where start point 52 is a first location in the x-y plane at which extrusion head 20 is directed to begin depositing the modeling material, and stop point 54 is a second location in the x-y plane at which extrusion head 20 is directed to stop depositing the modeling material. Accordingly, during the build operation, controller 30 directs extrusion head 20 to begin depositing the modeling material at start point 52, and to move along contour tool path 40 in the direction of arrow 56 until reaching point 58. Extrusion head 20 is then directed to follow the ring-geometry of contour tool path 40, as illustrated by arrows 44, until reaching point 60. Extrusion head 20 is then directed to move along contour tool path 40 in the direction of arrow 62 until reaching stop point 54, where extrusion head 20 stops depositing the modeling material.

This process provides a continuous road of the deposited modeling material at all locations around perimeter path 38 except at the intersection between points 58 and 60, where the outgoing and incoming roads meet. This intersection forms a seam for layer 36 (referred to as seam 64). As shown, start point 52 and stop point 54 are each located at an offset location from seam 64 within interior region 50. This is in comparison to start and stop points generated under a conventional data generation technique, in which the start and stop points would typically be collinear with the outer ring of contour tool path 40 (i.e., at points 58 and 60, respectively). Under the conventional technique, a contour tool path is typically generated to match the geometry of the exterior perimeter of a 3D model layer, with an offset that accounts for the road width (e.g., road width 42). Thus, the start and stop points would necessarily be located at locations that are collinear with the contour tool path, and the stop point would end up being located next to the start point (e.g., at points 58 and 60).

Due to variations in the extrusion process when starting and stopping the depositions, the modeling material deposited at a stop point corresponding to point 60 may bump into the modeling material previously deposited at a start point corresponding to point 58. This bumping can form a significant bulge of the modeling materials at the seam, which can be visually observed with the naked eye, thereby detracting from the aesthetic qualities of the resulting 3D model. Alternatively, if not enough modeling material is deposited between points 58 and 60, a gap may be formed at the seam, which can increase the porosity of the 3D model. The increased porosity can allow gases and fluids to pass into or through the 3D model, which may be undesirable for many functional purposes (e.g., for containing liquids). Accordingly, under the conventional data generation technique, proper seam sealing may be difficult to achieve, particularly due to the number of geometric complexities that may be required for a given 3D model.

Pursuant to the method of the present disclosure, however, seam 64 may be properly sealed by adjusting the location of the start point from point 58 to point 52, and by adjusting the location of the stop point from point 60 to point 54. This allows any variations in the extrusion process when starting and stopping the depositions to occur at a location that is within interior region 50 rather than adjacent to exterior surface 46. Any variations (e.g., bulges) that occur within interior region 50 are masked by the successive layers of 3D model 26, thereby concealing these effects within the filled body of 3D model 26 when completed. This allows the dimensions of perimeter path 38 at seam 64 to be truer to the dimensions of the digital representation of 3D model 26 and increases the consistency of the seams of successive layers of 3D model 26.

While shown at particular x-y coordinates within interior region 50, start point 52 and/or stop point 54 may alternatively be adjusted to a variety of different coordinate locations within interior region 50. Additionally, the coordinate locations may vary depending on the dimensions of the particular layer of the 3D model being built. In the embodiment shown in FIG. 3, start point 52 and stop point 54 are adjusted respectively from points 58 and 60 by vectors that are orthogonal to contour tool path 40 at perimeter path 38, and which point toward interior region 50. Examples of suitable distances for adjusting start point 52 from point 58 and/or for adjusting stop point 54 from point 60 (i.e., from a centerline of perimeter path 38) includes distances that are greater than 50% of road width 42 (i.e., beyond interior surface 48), with particularly suitable distances ranging from greater than about 50% of road width 42 to about 200% of road width 42, and with even more particularly suitable distances ranging from about 75% of road width 42 to about 150% of road width 42.

The locations of start point 52 and stop point 54 also allow the deposited modeling material to form a seal at seam 64 that extends inward within interior region 50. This reduces the porosity of 3D model 26 at seam 64, thereby reducing or eliminating the transmission of gases and/or liquids through seam 64. As a result, in comparison to the conventional techniques, the process of adjusting the start and stop points to locations within interior region 50 effectively eliminates the formation of bulges of modeling material at seam 64, while also reducing the porosity at seam 64.

Figure 4:
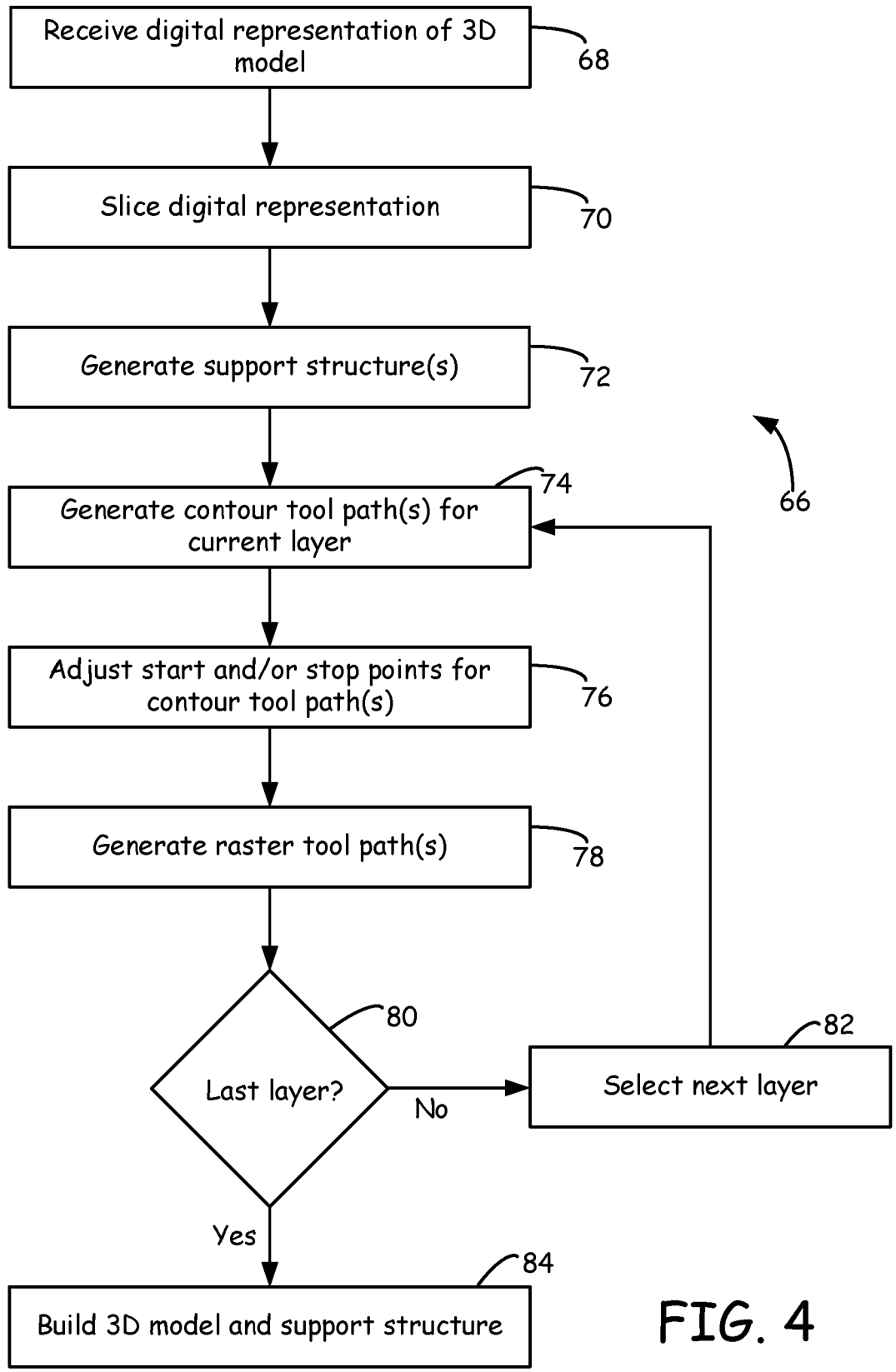
FIG. 4 is a flow diagram of a method for generating data and building a 3D model having concealed seams.

FIG. 4 is a flow diagram of method 66 for generating data and building a 3D model based on a digital representation of the 3D model, where the resulting 3D model includes concealed seams. The following discussion of method 66 is made with reference to 3D model 26 (shown in FIG. 1) and layer 36 of 3D model 24 (shown in FIGS. 2 and 3). However, method 66 is applicable for building 3D models and corresponding support structures having a variety of different geometries. As shown in FIG. 4, method 66 includes steps 68-84, and initially involves receiving a digital representation of 3D model 24 (step 68), slicing the digital representation and into multiple layers (step 70), and generating one or more pre-sliced support structures with computer 12 (step 72). In an alternative embodiment, steps 70 and 72 may be reversed such that one or more support structures are generated and the digital representation and the generated support structure(s) are then sliced.

Computer 12 then selects a first layer of the sliced layers and generates one or more contour tool paths based on the perimeter of the layer (step 74). For example, computer 12 may generate a contour tool path that defines the outer ring for perimeter path 38. In alternative examples, a given layer may include multiple contour tool paths for building multiple and separate parts and/or may include an exterior and an interior contour tool path for a single part (e.g., having a hollow interior cavity). At this point, the start and stop points for each generated contour tool path are collinear with the perimeter of the layer.

Computer 12 may then adjust the locations of the start point and/or the stop point to coordinate locations that are within the interior region for each generated contour tool path (step 76). For example, computer 12 may adjust the start point from point 58 to point 52, and may adjust the stop point from point 60 to point 54. This places start point 52 and stop point 54 within interior region 50. In an alternative embodiment, steps 74 and 76 of method 66 may be performed in a single step. In this embodiment, the adjustment locations of the start and stop points may be generated along with the generation of the contour tool path(s) (e.g., as predefined offset locations).

After the start and stop points are positioned in the interior region of the layer (e.g., within interior region 50 of layer 36), computer 12 may then generate additional tool paths (e.g., raster paths) to bulk fill the interior region (step 78). In this step, the generated additional tool paths desirably account for the locations of start point 52 and stop point 54, and the segments of contour tool path 40 that extend into interior region 50. When the layer is completed, computer 12 may then determine whether the current layer is the last of the sliced layers (step 80). In the current example, layer 36 is not the last layer. As such, computer 12 may select the next layer (step 82) and repeat steps 74-82 until the last layer is completed.

When the last layer is completed, computer 12 may transmit the resulting data to system 10 for building 3D model 26 and support structure 28 (step 84). During the build operation, extrusion head 20 follows the patterns of the tool paths for each layer, including the contour tool paths with the adjusted start and stop points. As such, each layer of 3D model 26 and/or of support structure 28 may include a concealed seam having start and stop points located within the interior region of the given layer. Furthermore, the seams of adjacent layers may be offset from each other, thereby further obscuring the locations of the seams.

Figure 5:
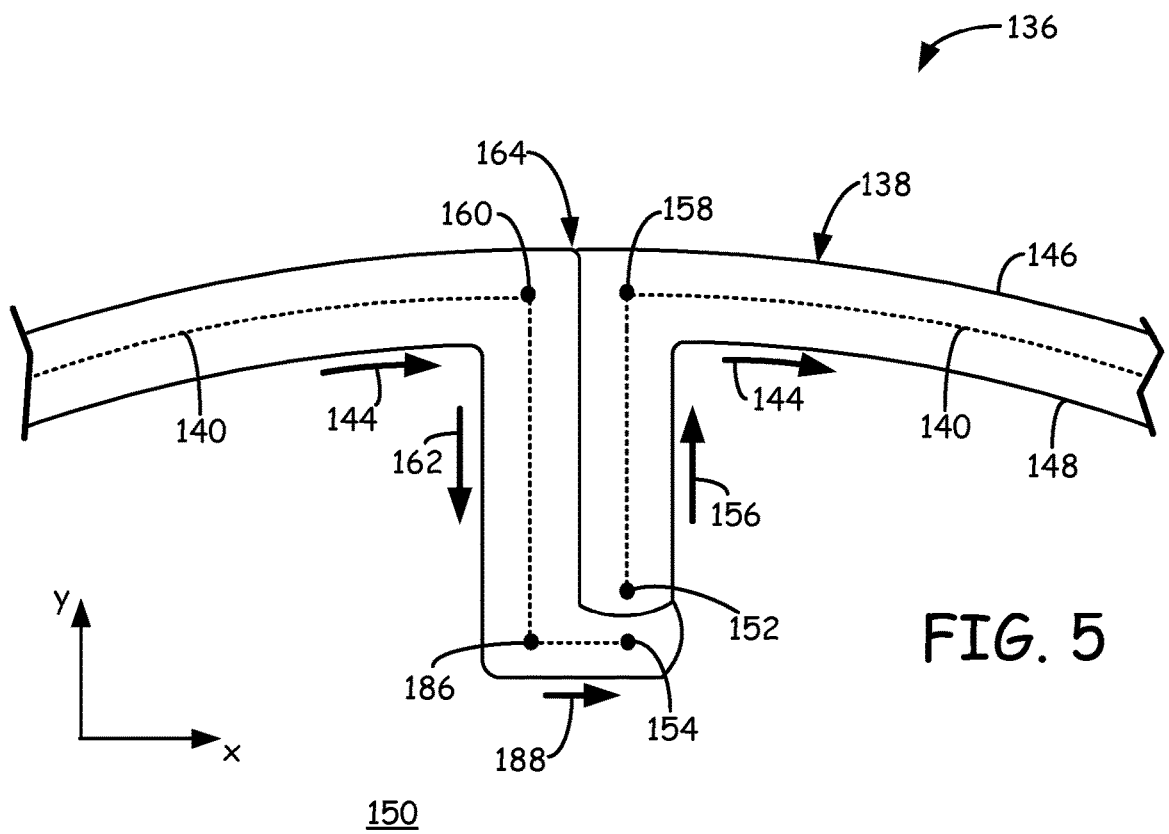
FIG. 5 is an alternative expanded view of section 3 taken in FIG. 2, illustrating a seam of a first alternative layer with a closed-square arrangement.

FIGS. 5-13 are alternative sectional views of section 3 shown in FIG. 2, illustrating layers 136-936, which are alternatives to layer 36 (shown in FIGS. 2 and 3) having different start and stop points, and where the references labels are increased by 100-900, respectively. As shown in FIG. 5, layer 136 includes contour tool path 140 having start point 152 and stop point 154 in a closed-square arrangement. In this embodiment, start point 152 is positioned at the same coordinate location within interior region 150 as start point 52 (shown in FIG. 3). The location of stop point 154, however, causes contour tool path 140 to turn at corner point 186. As such, contour tool path 140 extends inward from point 160 in the direction of arrow 162, and turns in the direction of arrow 188 at corner point 186 toward stop point 154. This arrangement further reduces the porosity of layer 136 by creating a bend of the deposited roads of build material within interior region 150.

Figure 6:
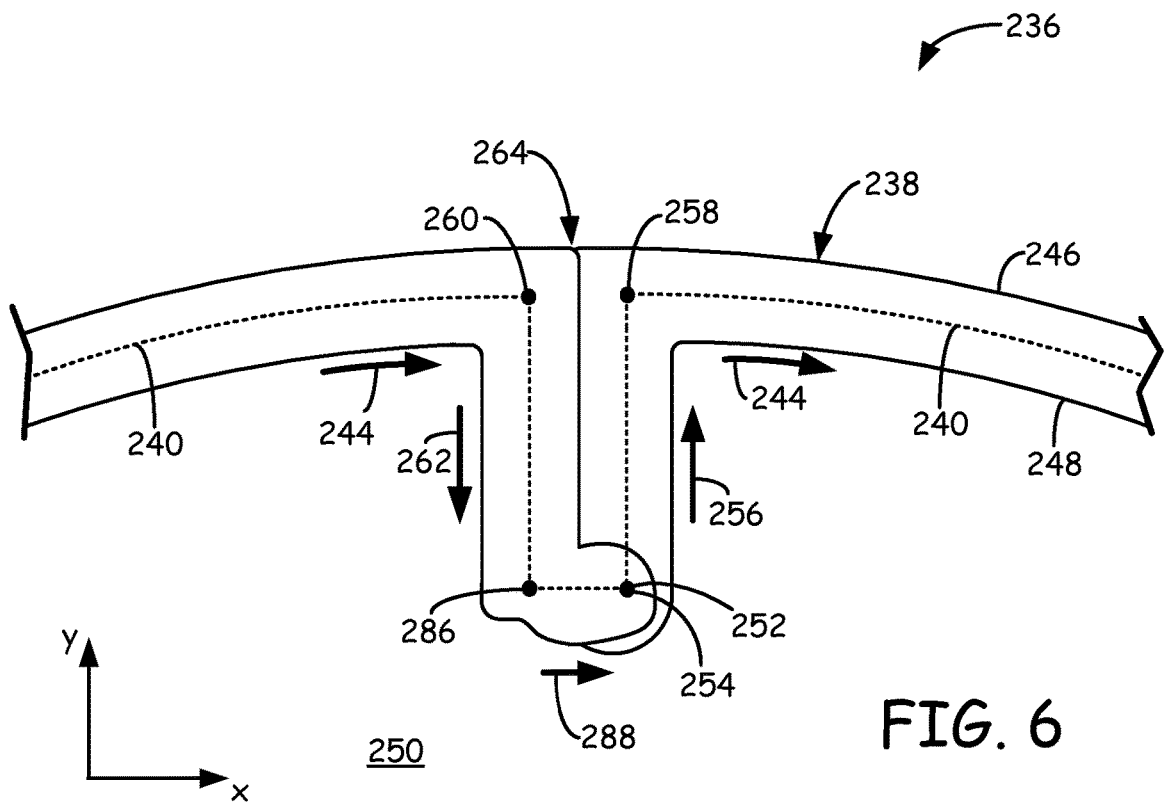
FIG. 6 is an alternative expanded view of section 3 taken in FIG. 2, illustrating a seam of a second alternative layer with an overlapped closed-square arrangement.

As shown in FIG. 6, layer 236 includes contour tool path 240 having start point 252 and stop point 254 in an overlapped closed-square arrangement. In this embodiment, start point 252 and stop point 254 are positioned at the same coordinate location within interior region 250 (i.e., stop point 254 overlaps start point 252). This arrangement also includes corner point 286, which bends contour tool path 240 in the same manner as discussed above for corner point 186 (shown in FIG. 5), which is beneficial for reducing porosity while also concealing seam 264.

The embodiment shown in FIG. 6 may be performed by gradually increasing the volumetric flow rate of the modeling material as extrusion head 20 travels between start point 252 and point 258, and also by gradually reducing the reducing the volumetric flow rate of the modeling material as extrusion head 20 travels between point 260 and stop point 254. For example, when extrusion head 20 travels along contour tool path 240 between start point 252 and point 258 in the direction of arrow 256, controller 30 may direct extrusion head 20 to gradually increase the volumetric flow rate from zero up to 100% of the standard operational rate. Extrusion head 20 may then deposit the modeling material at 100% of the standard operational rate while forming perimeter path 238 along arrows 244. Then, when extrusion head 20 travels along contour tool path 240 between point 260 and stop point 254 in the directions of arrows 262 and 288, controller 30 may direct extrusion head 20 to gradually reduce the volumetric flow rate from 100% of the standard operational rate down to zero. This process reduces the amount of modeling material that is accumulated along the vertical z-axis at the intersection of start point 252 and stop point 254.

Figure 7:
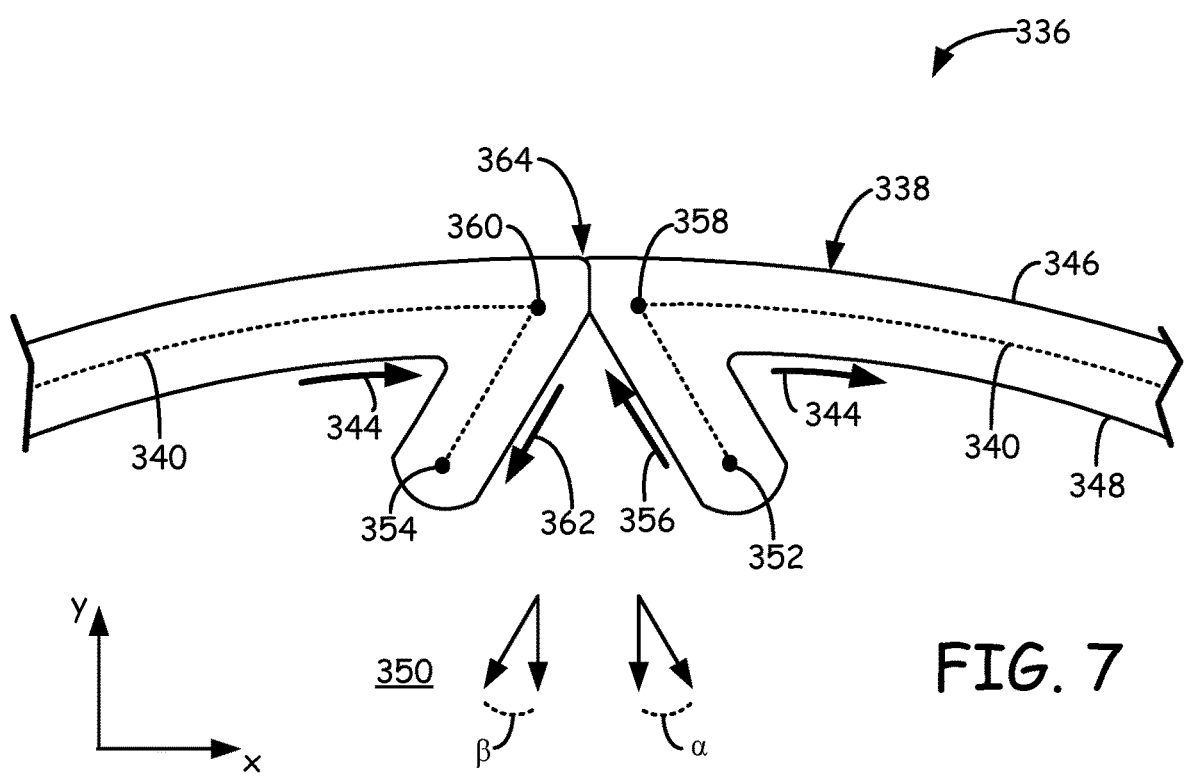
FIG. 7 is an alternative expanded view of section 3 taken in FIG. 2, illustrating a seam of a third alternative layer with an open-triangle arrangement.

As shown in FIG. 7, layer 336 includes contour tool path 340 having start point 352 and stop point 354 in an open-triangle arrangement. In this embodiment, start point 352 and stop point 354 extend at angles relative to the orthogonal directions of start point 52 and stop point 54 (shown in FIG. 3). In this embodiment, the corner points that direct contour tool path 340 into and out of interior region 350 (i.e., points 358 and 360) are desirably offset from each other by a distance that is about 90% of road width 342 to about 100% of road width 342. This allows seam 364 to be properly sealed at exterior surface 346 of perimeter path 338.

As shown, start point 352 is positioned at a coordinate location within interior region 350 that is offset at angle α from the orthogonal axis to contour tool path 340 at perimeter path 338 (i.e., taken at point 358). Similarly, stop point 354 is positioned at a coordinate location within interior region 350 that is offset at angle β from the orthogonal axis to contour tool path 340 at perimeter path 338 (i.e., taken at point 360). Angles α and β may be the same values from their respective orthogonal axis, or may be different values, which may be affected by the geometry of layer 336. Examples of suitable angles for each of angle α and angle β range from zero degrees (i.e., parallel to the orthogonal axis, as shown in FIG. 3) to about 60 degrees, with particularly suitable angles ranging from about 30 degrees to about 45 degrees. The angled locations of start point 352 and stop point 354 reduce the extent that start point 352 and stop point 354 extend into interior region 350. This is arrangement suitable for use with 3D models having thin-walled regions.

Figure 8:
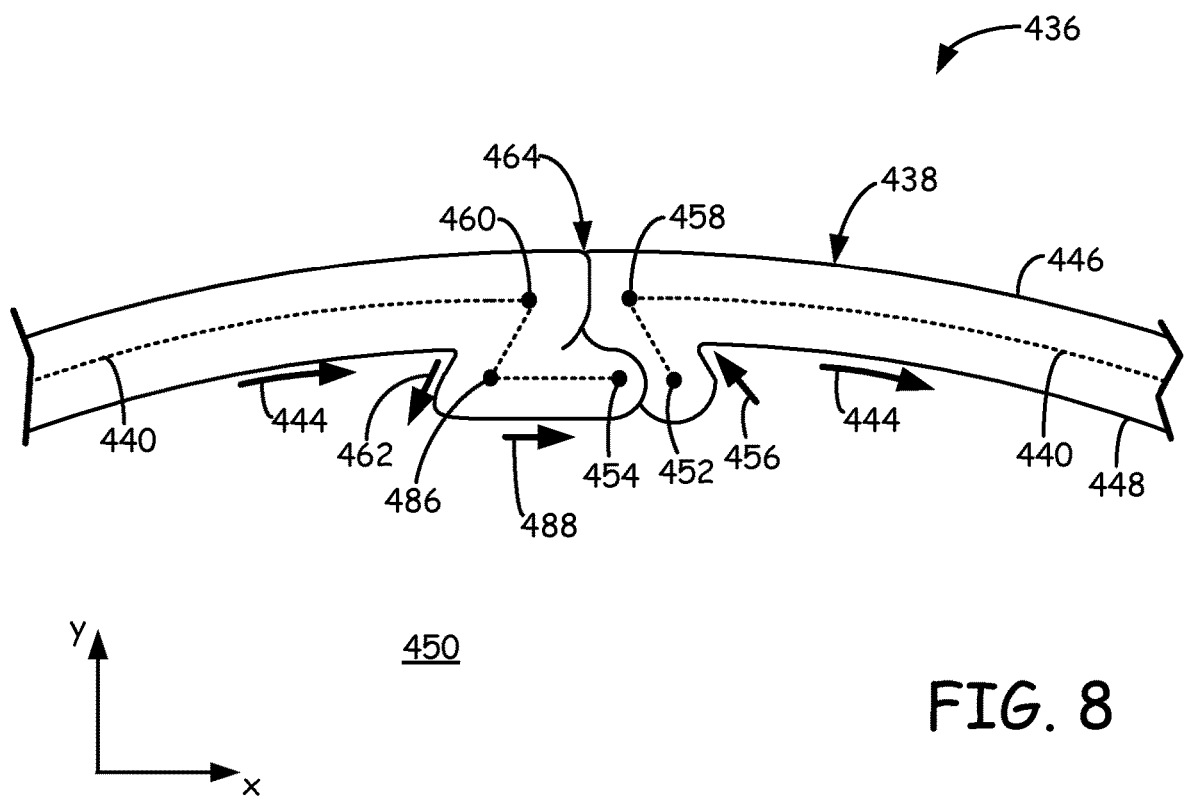
FIG. 8 is an alternative expanded view of section 3 taken in FIG. 2, illustrating a seam of a fourth alternative layer with a closed-triangle arrangement.

As shown in FIG. 8, layer 436 includes contour tool path 440 having start point 452 and stop point 454 in a closed-triangle arrangement. In this embodiment, start point 452 extends at an angle relative to the orthogonal direction of start point 52 (shown in FIG. 3) in a similar manner to that discussed above for start point 352 (shown in FIG. 7). Furthermore, this arrangement includes corner point 486, which bends contour tool path 440 in a similar manner to that discussed above for corner point 186 (shown in FIG. 5). This combination further reduces porosity, and also further reduces the extent that start point 452 and stop point 454 extend into interior region 450. As such, this embodiment is also suitable for use with 3D models having thin-walled regions.

Figure 9:
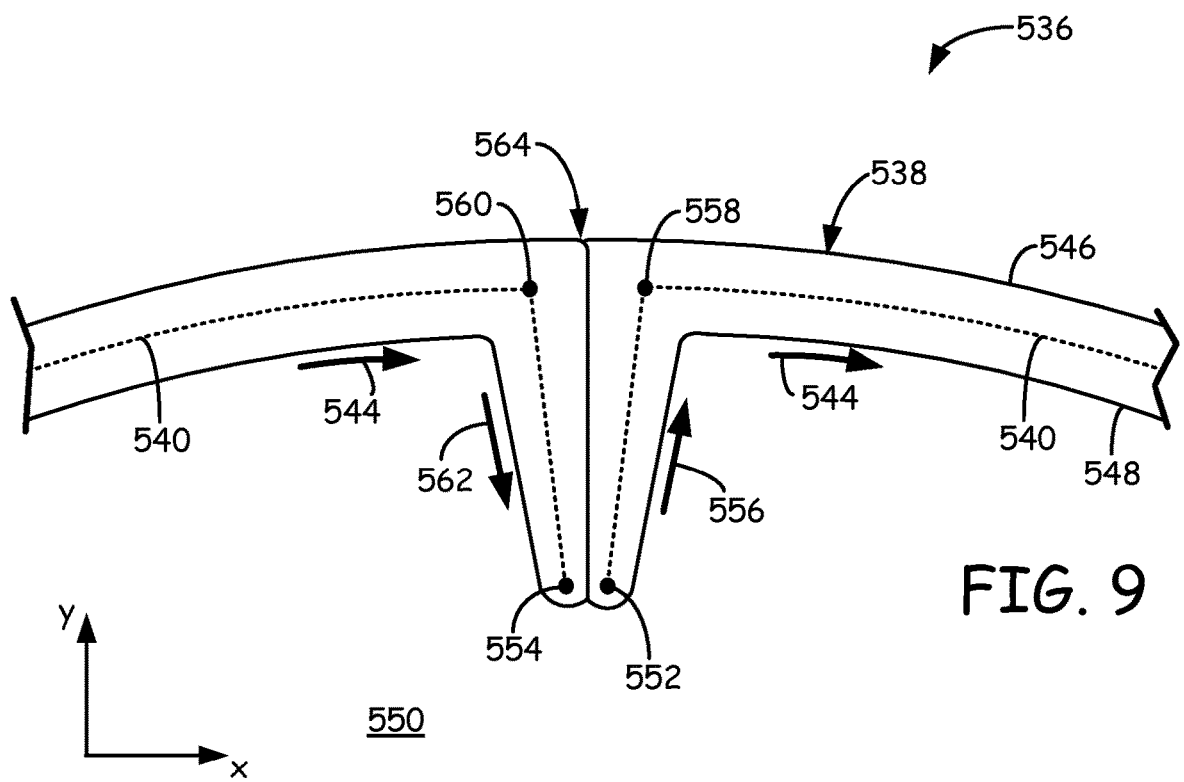
FIG. 9 is an alternative expanded view of section 3 taken in FIG. 2, illustrating a seam of a fifth alternative layer with a converging-point arrangement.

As shown in FIG. 9, layer 536 includes contour tool path 540 having start point 552 and stop point 554 in a converging-point arrangement. In this embodiment, start point 352 and stop point 354 are positioned closer to each other compared to points 558 and 560. The corner points that direct contour tool path 540 into interior region 550 (i.e., points 558 and 560) are also desirably offset from each other by a distance about equal to the road width of perimeter path 538. As such, start point 552 and stop point 554 are offset from each other by a distance that is less than the road width.

This embodiment may be performed by gradually increasing the volumetric flow rate of the modeling material as extrusion head 20 travels along contour tool path 540 in the direction of arrow 556 between start point 552 and point 558. Similarly, as extrusion head 20 travels along contour tool path 540 in the direction of arrow 562 between point 560 and stop point 554, the volumetric flow rate may gradually decrease. This allows proper amounts of modeling material to be deposited at seam 564 and also reduces the amount of modeling material that is accumulated along the vertical z-axis at the intersection between start point 552 and stop point 554.

Figure 10:
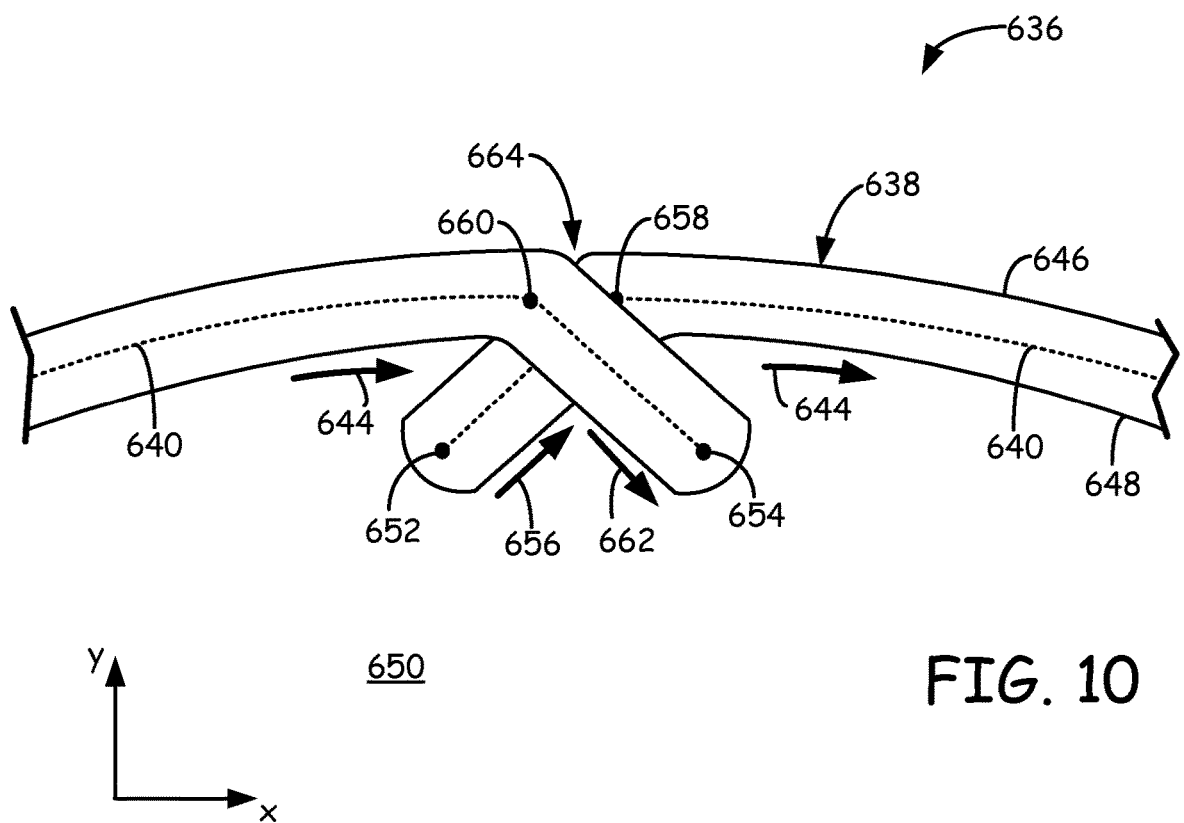
FIG. 10 is an alternative expanded view of section 3 taken in FIG. 2, illustrating a seam of a sixth alternative layer with an overlapped-cross arrangement.

As shown in FIG. 10, layer 636 includes contour tool path 640 having start point 652 and stop point 654 in an overlapped-cross arrangement. In this embodiment, the relative locations of start point 652 and stop point 654 cause contour tool path 640 to overlap at seam 664. This embodiment may also be performed by gradually adjusting the volumetric flow rate of the modeling material as extrusion head 20 travels along contour tool path 640. For example, the volumetric flow rate may be decreased from 100% of the standard operational rate at point 660 down to zero at stop point 654. However, in this embodiment, it is desirable for the volumetric flow rate of the modeling material to be substantially decreased at or shortly after point 660 to reduce the amount of modeling material that is accumulated along the vertical z-axis a seam 664.

Accordingly, during a build operation, extrusion head 20 may initially follow contour tool path 640 from start point 652 to point 658 in the direction of arrow 656. The volumetric flow rate of the modeling material may also be gradually increased at this stage. Extrusion head 20 may then deposit the modeling material at 100% of the standard operational rate while forming perimeter path 638 along arrows 644. Then, extrusion head 20 travels along contour tool path 640 in the direction of arrow 662 between point 660 and stop point 654, overlapping the previously deposited modeling material. As such, as extrusion head 20 travels in the direction of arrow 662, the volumetric flow rate may be decreased to reduce the amount of modeling material that is accumulated along the vertical z-axis at seam 664. The overlapping arrangement shown in FIG. 10 further reduces porosity by effective overlapping the intersection at seam 664. In additional embodiments, contour tool path 640 may further bent within interior region 650 to position stop point 654 at or adjacent to start point 652, as discussed above for the embodiments of layers 136 and 236 (shown in FIGS. 5 and 6, respectively).

Figure 11:
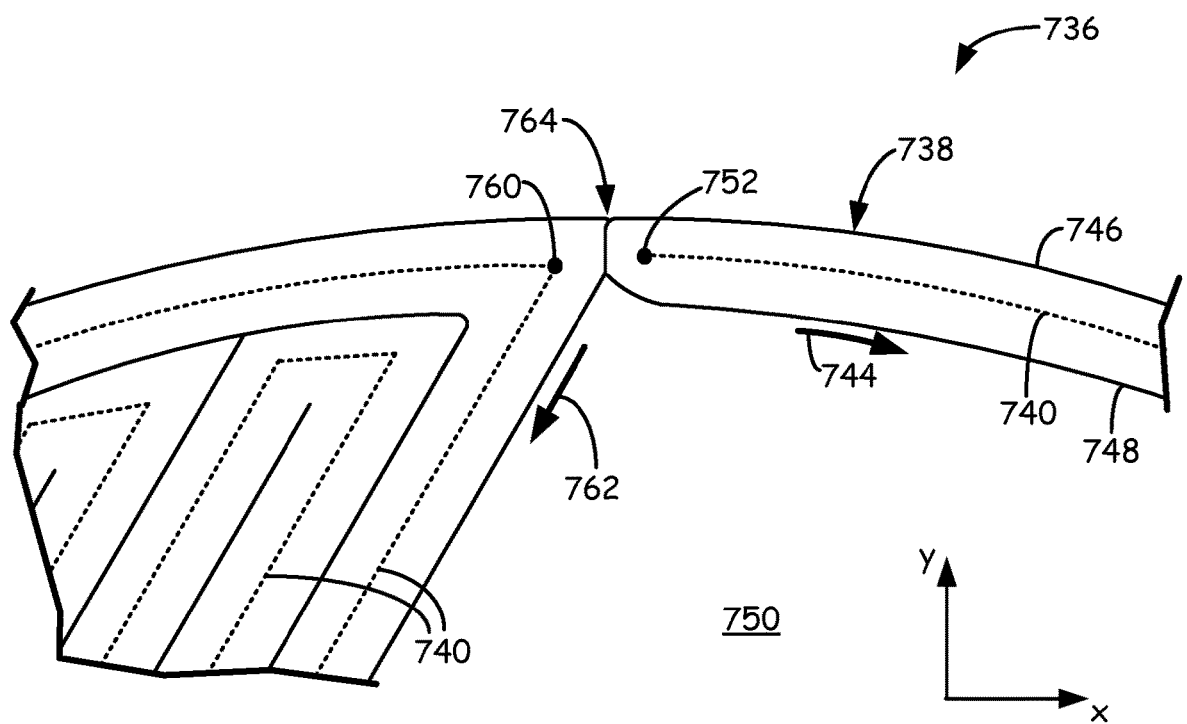
FIG. 11 is an alternative expanded view of section 3 taken in FIG. 2, illustrating a seam of a seventh alternative layer with a combined perimeter and raster pattern arrangement, where a start point is located adjacent to the seam and a stop point is located within an interior region.
Figure 12:
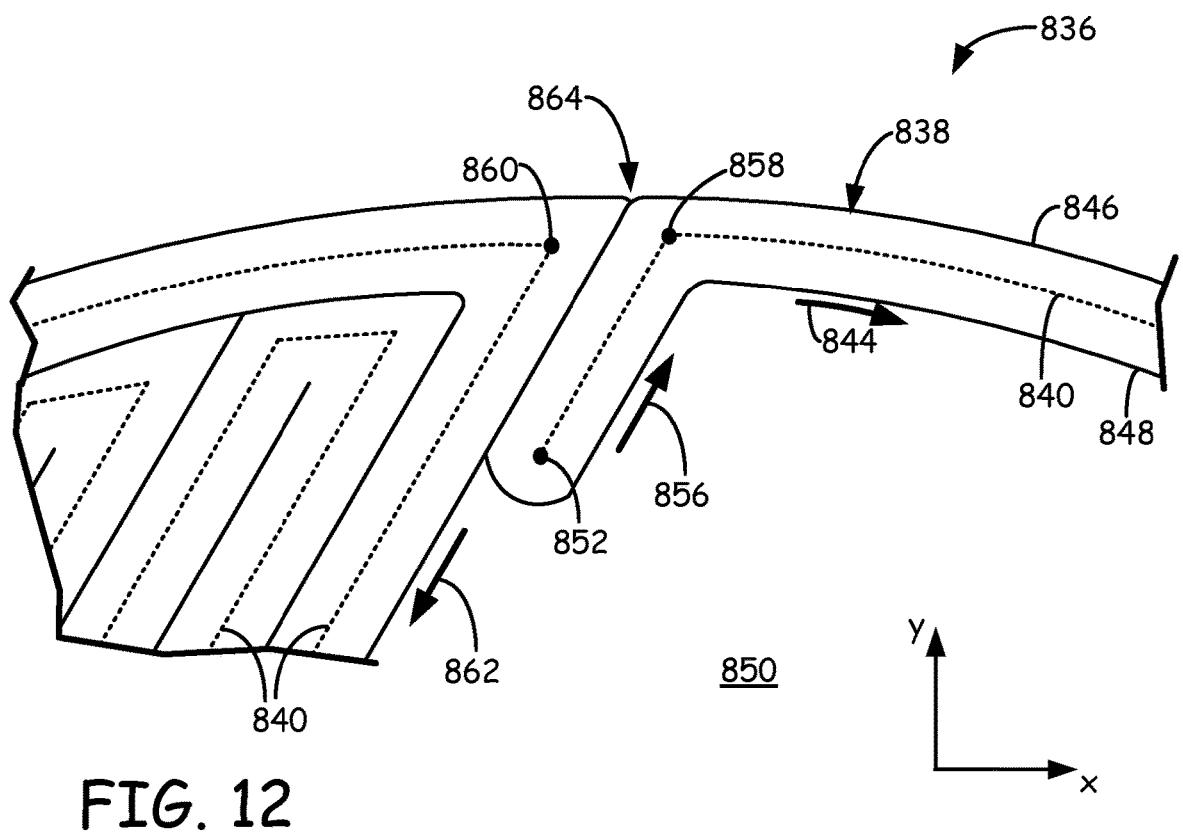
FIG. 12 is an alternative expanded view of section 3 taken in FIG. 2, illustrating a seam of an eighth alternative layer with a combined perimeter and raster pattern arrangement, where start and stop points are each located within an interior region.

FIGS. 11 and 12 illustrate additional alternative embodiments in which the contour tool path also functions as an interior raster path to fill at least a portion of the interior region. As shown in FIG. 11, layer 736 includes contour tool path 740 having start point 752 located adjacent to exterior surface 746. As such, in this embodiment, start point 752 is not adjusted to a location within interior region 750. However, the stop point of contour tool path 740 (not shown) is adjusted to a location within interior region 750 and contour tool path 740 is generated to at least partially fill interior region 750 with a raster pattern.

During a build operation, extrusion head 20 initially follows contour tool path 740 from start point 752 in the direction of arrow 744 to form perimeter path 738. Upon reaching point 760, extrusion head 20 then turns and follows contour tool path 740 in the direction of arrow 762 and continues to deposit the modeling material in a back-and-forth raster pattern within interior region 750. This embodiment is beneficial for reducing the number of times that a tip of extrusion head 20 needs to be picked up and moved. Since this process can be performed with each layer of 3D model 26 and support structure 28, this can provide substantial time savings when building 3D model 26 and support structure 28 in system 10.

Additionally, start point 752 and the stop point for contour tool path 740 may also be positioned at locations in the x-y plane that will maximize the area of interior region 750 that is filled with the raster pattern of contour tool path 740. For example, after generating contour tool path 740, pursuant to step 74 of method 66 (shown in FIG. 4), the start and stop points may be repositioned around the perimeter to a point that maximizes the raster pattern fill within interior region 750 before reaching the stop point. This further reduces the number of times that a tip of extrusion head 20 needs to be picked up and moved for building each layer. Furthermore, the generated raster pattern for contour tool path 740 may be offset by an angle between each successive layer (e.g., by 90 degrees). As a result, repositioning the start and stop points in this manner will cause the seams of each successive layer to be positioned at different locations in the x-y plane. This further conceals the seams of a 3D model (e.g., 3D model 26) by staggering the locations of the seams between successive layers.

As shown in FIG. 12, layer 836 includes contour tool path 840 having both start point 852 and the stop point (not shown) located within interior region 850, where contour tool path is generated to at least partially fill interior region 850 with a raster pattern, as discussed above for layer 736 (shown in FIG. 11). In the embodiment shown in FIG. 12, however, start point 852 is also located within interior region 850, desirably at an angle that substantially follows the raster pattern of contour tool path 840. This combines the process time savings attainable with the integrated raster pattern along with the reduced porosity that is achieved by positioning start point 852 within interior region 850. These benefits are in addition to the concealment of seam 864, which allows the dimensions of perimeter path 838 at seam 864 to be truer to the dimensions of the digital representation of 3D model 26 and increases the consistency of the seams of successive layers of 3D model 26.

Figure 13:
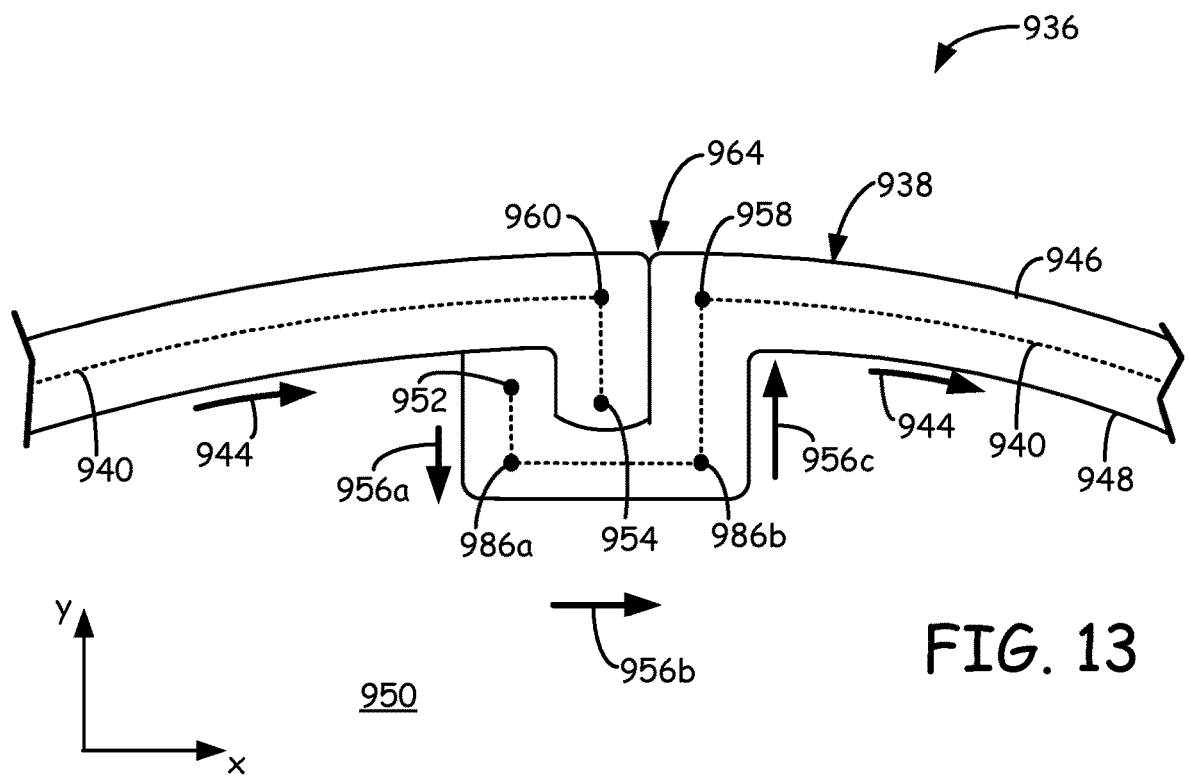
FIG. 13 is an alternative expanded view of section 3 taken in FIG. 2, illustrating a seam of a ninth alternative layer with an crimped-square arrangement.

As shown in FIG. 13, layer 936 includes contour tool path 940 having start point 952 and stop point 94 in a crimped-square arrangement. In this embodiment, start point 952 is positioned within interior region 950 such that contour tool path 940 turns at corner points 986a and 986b. During a build operation, extrusion head 20 initially follows contour tool path 940 from start point 952 in the direction of arrows 956a, 956b, and 956c, until it reaches point 958. Extrusion head 20 may form perimeter path 938 along arrows 944 until it reaches point 960. Extrusion head 20 may then turn inward until it reaches stop point 954. In an alternative embodiment, start point 952 and stop point 954 may be flipped such that the crimped square geometry is formed around start point 952. The arrangement depicted in FIG. 13 positions start point 952 and stop point 954 within interior region 950, while also further reducing the porosity of layer 936 by crimped square of the deposited roads of build material within interior region 950.

Figure 14:
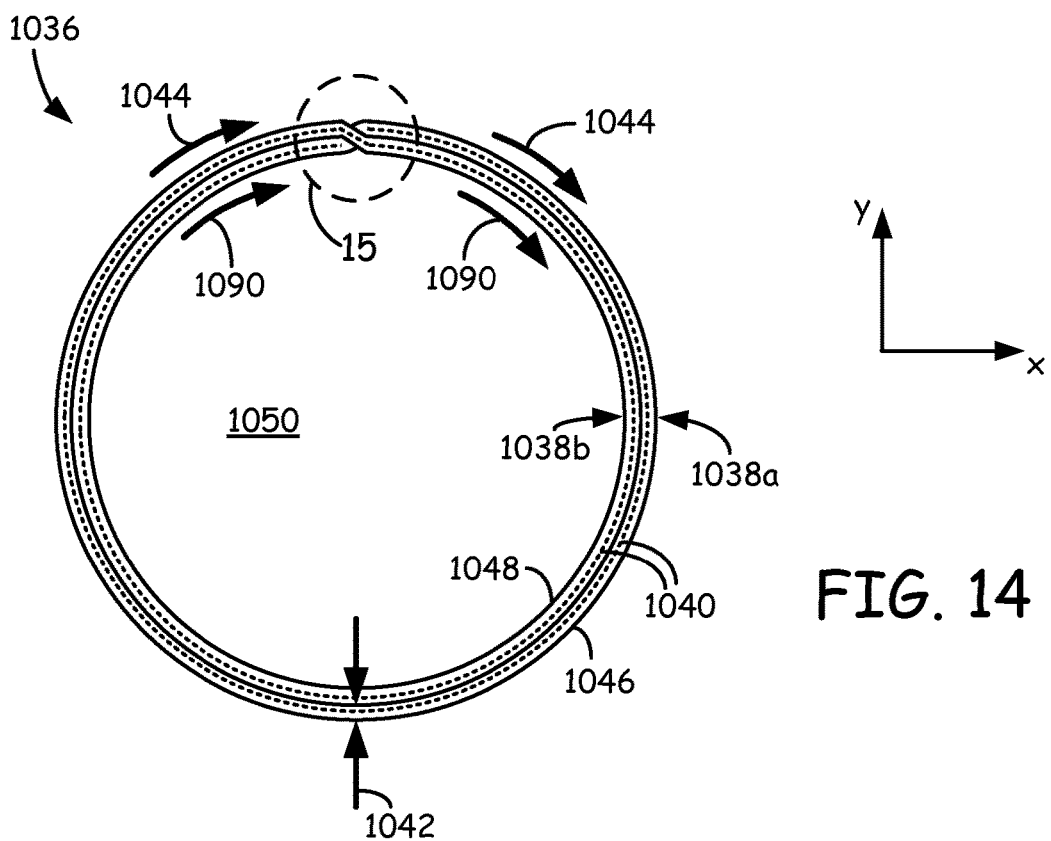
FIG. 14 is a top view of a tenth alternative layer of the 3D model being built with the extrusion-based digital manufacturing system.
Figure 15:
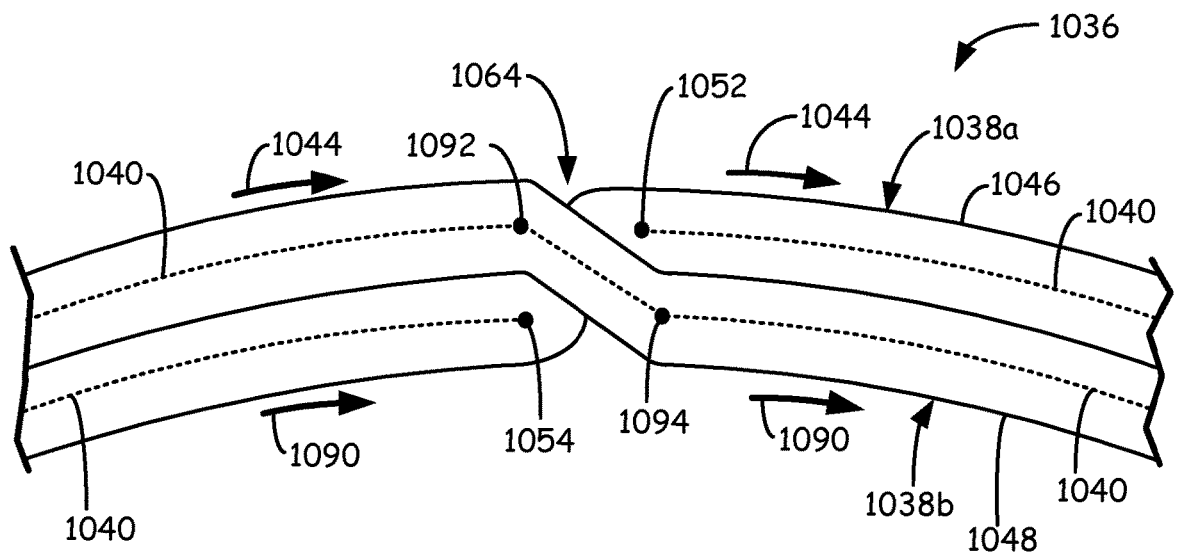
FIG. 15 is an expanded view of section 15 taken in FIG. 14, illustrating a seam of the tenth alternative layer with a step-over arrangement.
Figure 15:
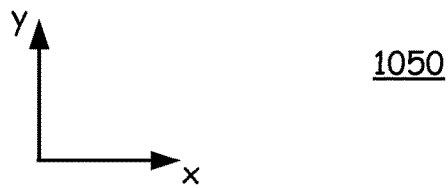

FIGS. 14 and 15 illustrate layer 1036, which is an additional alternative to layer 36 (shown in FIGS. 2 and 3), where the reference labels are increased by 1000. As shown in FIG. 14, layer 1036 includes perimeter paths 1038a and 1038b, which are a pair roads of a modeling material that is deposited by extrusion head 20 along contour tool path 1040 in two passes, as represented by arrows 1044 (first pass to form perimeter path 1038a) and arrows 1090 (second pass to form perimeter path 1038b). As further shown, perimeter path 1038a includes exterior surface 1046 and perimeter path 1038b includes interior surface 1048. Exterior surface 1046 is the outward-facing surface of perimeter path 1038a, which may be observable when 3D model 26 is completed. Interior surface 1048 is the inward-facing surface of perimeter path 1038b, which defines interior region 1050. Interior region 1050 is the region of layer 1036 confined within perimeter paths 1038a and 1038b, and may be filled with additional modeling material deposited along additionally generated tool paths (e.g., raster paths, not shown).

As shown in FIG. 15, contour tool path 1040 includes start point 1052 and stop point 1054, where stop point 1054 is located within interior region 1050. Accordingly, during the build operation, controller 30 directs extrusion head 20 to begin depositing the modeling material at start point 1052, and to move along contour tool path 1040 in the direction of arrows 1044 until reaching point 1092. This substantially forms perimeter path 1038a. At this point, while continuing to deposit the modeling material, extrusion head 20 steps over from perimeter path 1038a to begin forming perimeter path 1038b at point 1094. Extrusion head 20 then continues to moves along contour tool path 1040 in the direction of arrows 1090 until reaching stop point 1054. This forms perimeter path 1038b.

As shown, stop point 1054 is adjusted to a location within interior region 1050. As such, seam 1064 also extends inward within interior region 1050. This effectively eliminates the formation of bulges of modeling material at seam 1064. Additionally, the step-over arrangement also reduces the porosity of 3D model 26 at seam 1064, thereby reducing or eliminating the transmission of gases and/or liquids through seam 1064.

In an alternative embodiment, start point 1052 and stop point 1054 may be flipped such that start point 1052 is located within interior region 1050. In this embodiment, when extrusion head 20 reaches stop point 1054 (at the location of start point 1052 in FIG. 15), extrusion head 20 may step back again toward the location of stop point 1054 in FIG. 15, thereby creating an X-pattern at seam 1064. The volumetric flow rate of the modeling material is desirably reduced when stepping back again to reduce the amount of the modeling material that is accumulated along the vertical z-axis at seam 1064.

In additional alternative embodiments, the step-over arrangement may be continued to form additional perimeter paths 1038, thereby increasing the overall thickness of the perimeter paths. These embodiments are beneficial for use with thin-walled regions where the formation of raster patterns may be more time consuming. Furthermore, the embodiments discussed in FIGS. 14 and 15 may be combined with the raster pattern embodiments shown in FIGS. 11 and 12. In these embodiments, contour tool path 1040 may step over into the raster pattern to fill at least a portion of interior region 1050.

Figure 16:
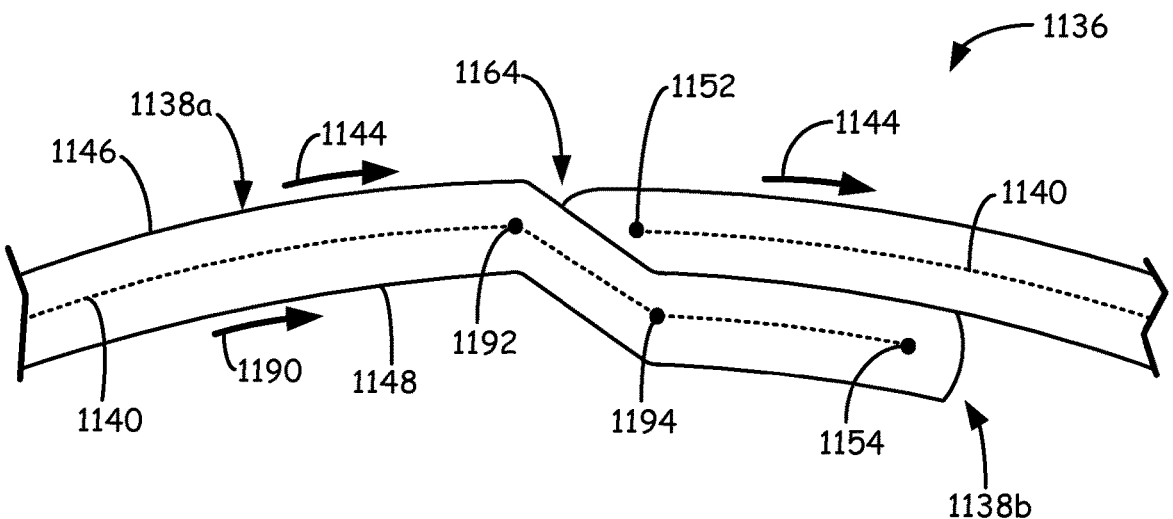
FIG. 16 is an alternative expanded view of section 15 taken in FIG. 14, illustrating a seam of an eleventh alternative layer with a shortened step-over arrangement.
Figure 16:
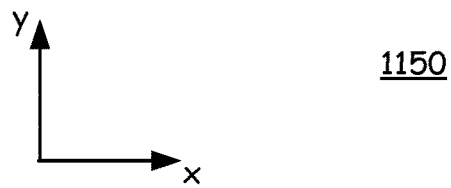

FIG. 16 is an alternative sectional view of section 15 shown in FIG. 14, illustrating layer 1136, which is an alternative to layer 1036 (shown in FIGS. 14 and 15) having a different stop point, and where the references labels are increased by 100. As shown in FIG. 16, contour tool path 1140 of layer 1136 includes start point 1152 and stop point 1154, where start point 1152 is located at the same position as start point 1052 (shown in FIG. 15). Stop point 1154, however, stops the deposition of the modeling material prior to forming a complete ring for perimeter path 1138b. While shown at the particular location in FIG. 16, stop point 1054 may be located at any distance from point 1194. This embodiment is also suitable for extending seam 1164 inward within interior region 1150, thereby effectively eliminating the formation of bulges of modeling material at seam 1164. Additionally, the step-over arrangement also reduces the porosity of 3D model 26 at seam 1164 and the shortened length of perimeter path 1138b is beneficial for use in thin-wall regions.

EXAMPLES

The present disclosure is more particularly described in the following examples that are intended as illustrations only, since numerous modifications and variations within the scope of the present disclosure will be apparent to those skilled in the art. Build operations were preformed with the method of the present disclosure to fabricate 3D models of Examples 1-4, each having concealed seams. Each 3D model of Examples 1-4 were built from the same digital representation having a filled cylindrical geometry.

For each 3D model of Examples 1-4, the digital representation was provided to a computer capable of communicating with an extrusion-based digital manufacturing system. The computer then sliced the digital representation into multiple layers with a software program commercially available under the trade designation "INSIGHT" from Stratasys, Inc., Eden Prairie, Minn. The software program also generated contour tool paths for each sliced layer. In addition, the start and stop points of each contour tool path were adjusted to predefined locations within the interior regions defined by the respective contour tool paths.

The start and stop points for Example 1 were adjusted to an open-square arrangement as depicted in layer 36 (shown in FIG. 3). The start and stop points for Example 2 were adjusted to an overlapped closed-square arrangement as depicted in layer 236 (shown in FIG. 6). The start and stop points for Example 3 were adjusted to an converging-point arrangement as depicted in layer 536 (shown in FIG. 9). The start and stop points for Example 4 were adjusted to an overlapped-cross arrangement as depicted in layer 536 (shown in FIG. 10). For each modified contour tool path, raster tool paths were then generated within the interior regions, where the raster tool paths accommodated the adjustments to the start and stop locations of the contour tool paths.

In addition to the 3D models of Examples 1-4, a 3D model of Comparative Example A was prepare from the same digital representation and using the same above-discussed steps. However, for Comparative Example A, the start and stop locations of the contour tool paths were not adjusted. As such, the start and stop locations remained collinear with the outer rings of the contour tool paths.

For each 3D model of Examples 1-4 and Comparative Example A, the resulting data was then transmitted to the extrusion-based digital manufacturing system, which was a fused deposition modeling system commercially available under the trade designation "FORTUS 400mc" from Stratasys, Inc., Eden Prairie, Minn. Based on the received data, the system then built each 3D model from an acrylonitrile-butadiene-styrene (ABS) copolymer modeling material.

After the build operations were completed, the perimeter path seams of each 3D model was visually inspected. For the 3D model of Comparative Example A, the perimeter path seams exhibited surface bulges of modeling material that were readily identifiable by the naked eye. In comparison, however, the perimeter path seams of the 3D models of each of Examples 1-4 did not exhibit any surface bulging and were consistent between the successive layers. As such, the method of the present disclosure is suitable for effectively concealing the seams of the perimeter paths (created by the contour tool paths). As discussed above, this may increase the aesthetic and functional qualities of the resulting 3D models.

Although the present invention has been described with reference to preferred embodiments, workers skilled in the art will recognize that changes may be made in form and detail without departing from the spirit and scope of the invention.

The invention claimed is:

1. A method for printing a layer of a three-dimensional part with an extrusion-based digital manufacturing system having an extrusion head, the method comprising:
depositing a material from the extrusion head at an increasing volumetric flow rate along a first segment of a contour tool path to produce the first segment;
depositing the material from the extrusion head while moving the extrusion head along a perimeter segment of the contour tool path, which extends from the first segment, to produce a perimeter road portion; and
depositing the material from the extrusion head at a decreasing volumetric flow rate while moving the extrusion head along a second segment of the contour tool path which extends from the perimeter segment such that at least a portion of the second segment steps-over a portion of the first segment and thereby forms a seam comprising a step-over portion;
wherein the first segment and the second segment each have a reduced volume of the deposited material at the seam compared to the contour tool path segment;
wherein the step-over portion of the first portion and the second portion has substantially a same height and width as a height and width of the contour road portion; and wherein the seam reduces surface porosity of the three-dimensional part.

2. The method of claim 1, wherein the perimeter road portion defines an interior region of the three-dimensional part, and wherein the first segment and the second portion are each partially located within the interior region of the three-dimensional part.

3. The method of claim 1, and further comprising:
generating the first segment of the contour tool path, the perimeter segment of the contour tool path, and the second segment of the contour tool path with a computer; and
transmitting instructions for the first segment of the contour tool path segment, the perimeter segment of the contour tool path, and the second segment of the contour tool path from the computer to a controller of the extrusion-based digital manufacturing system.

4. The method of claim 1, wherein the seam has an overlapped-cross arrangement.

5. The method of claim 1, wherein the deposited material comprises a thermoplastic material.

6. The method of claim 1, wherein the first segment includes a start point and the second segment includes a stop point wherein the stop point overlaps the start point.

7. An article formed by the method of claim 1.

8. A method for printing a layer of a three-dimensional part with an extrusion-based digital manufacturing system having an extrusion head, the method comprising:
depositing a material from the extrusion head at an increasing volumetric flow rate along a first segment of a contour tool path to produce an outgoing road portion;
depositing the material from the extrusion head while moving the extrusion head along a perimeter segment of the contour tool path, which extends from the first segment, to produce a perimeter road portion having a height and width; and
depositing the material from the extrusion head at a decreasing volumetric flow rate while moving the extrusion head along a second segment of the contour tool path which extends from the perimeter segment such that at least a portion of the second segment contacts a portion of the first segment and thereby forms a seam comprising a step-over portion;
wherein the first segment and the second segment each have a reduced volume of the deposited material at the seam compared to the contour tool path segment such that the seam has substantially a same height and width as the height and width of the perimeter road portion; and wherein the seam reduces surface porosity of the three-dimensional part.

9. The method of claim 8, wherein the seam has an overlapped-cross arrangement.

10. The method of claim 8, wherein the deposited material comprises a thermoplastic material.

11. The method of claim 8, and further comprising heating a build environment in which the 3D part is built in the layer-by-layer manner.

12. The method of claim 11, wherein the build environment comprises an enclosed build chamber.

13. A method for printing a layer of a three-dimensional part with an extrusion-based digital manufacturing system having an extrusion head, the method comprising:
depositing a material from the extrusion head at an increasing volumetric flow rate along a first segment of a contour tool path such that the first portion has an increasing height from a first height to a second height;
depositing the material from the extrusion head while moving the extrusion head along a perimeter segment of the contour tool path, which extends from the first segment, to produce a perimeter road portion having a height proximate the second height; and
depositing the material from the extrusion head along a second segment at a decreasing volumetric flow rate such that the second segment has a height that decreases from the second height to the first height, wherein the first and second segments abut each other and form a seam substantially having the second height; and
wherein the seam reduces surface porosity of the three-dimensional part.

14. The method of claim 13, and further comprising:
generating the first segment of the contour tool path, the perimeter segment of the contour tool path, and the second segment of the contour tool path with a computer; and
transmitting instructions for the first segment of the contour tool path segment, the perimeter segment of the contour tool path, and the second segment of the contour tool path from the computer to a controller of the extrusion-based digital manufacturing system.

15. The method of claim 13, wherein the deposited material comprises a thermoplastic material.

16. The method of claim 13, and further comprising heating a build environment in which the 3D part is built in the layer-by-layer manner.

17. The method of claim 13, wherein the build environment comprises an enclosed build chamber.

* * * * *